United States Patent [19]
Palffy

[11] Patent Number: 5,819,801
[45] Date of Patent: Oct. 13, 1998

[54] METHOD AND DEVICE FOR PRODUCING PERIODICAL IMPULSE CHANGES IN A FLUID FLOW

[75] Inventor: Sandor Palffy, Ennetbaden, Switzerland

[73] Assignee: Festo KG, Esslingen, Germany

[21] Appl. No.: 769,232

[22] Filed: Dec. 18, 1996

[30] Foreign Application Priority Data

Dec. 22, 1995 [EP] European Pat. Off. .............. 95810815

[51] Int. Cl.⁶ ....................................................... F16K 7/07
[52] U.S. Cl. ................................................. 137/826; 251/5
[58] Field of Search ................................. 251/5; 137/826

[56] References Cited

U.S. PATENT DOCUMENTS

| | | | |
|---|---|---|---|
| 2,014,355 | 9/1935 | Hussman | 285/90 |
| 2,590,215 | 3/1952 | Sasa | 251/5 X |
| 3,387,630 | 6/1968 | Routsan | 251/5 X |
| 4,135,550 | 1/1979 | Andersson | 251/5 X |

FOREIGN PATENT DOCUMENTS

| | | | |
|---|---|---|---|
| 2566504 | 6/1985 | France | F16L 11/12 |
| 4240323 | 6/1994 | Germany | F16L 55/04 |

OTHER PUBLICATIONS

Zeitschrift des Vereines Deutscher Ingenievre, Berlin, 1909, p. 1496, Fig. 26 and accompanying text. (Translation attached.).

Primary Examiner—John Fox
Attorney, Agent, or Firm—Schweitzer Cornman Gross & Bondell LLP

[57] ABSTRACT

A device for automatically producing periodical impulse changes in a pressure line is provided with an elastic intermediate member impacted by a control pressure. Pressurizing the exterior of the intermediate member produces a pulsating flow of the fluid in the pressure line, obviating the use of control members, flaps, etc. In a preferred embodiment, the required control pressure is drawn from a bypass in the pressure line. The present invention may be put to Advantageous use in numerous fields in pneumatic and in process engineering.

2 Claims, 3 Drawing Sheets

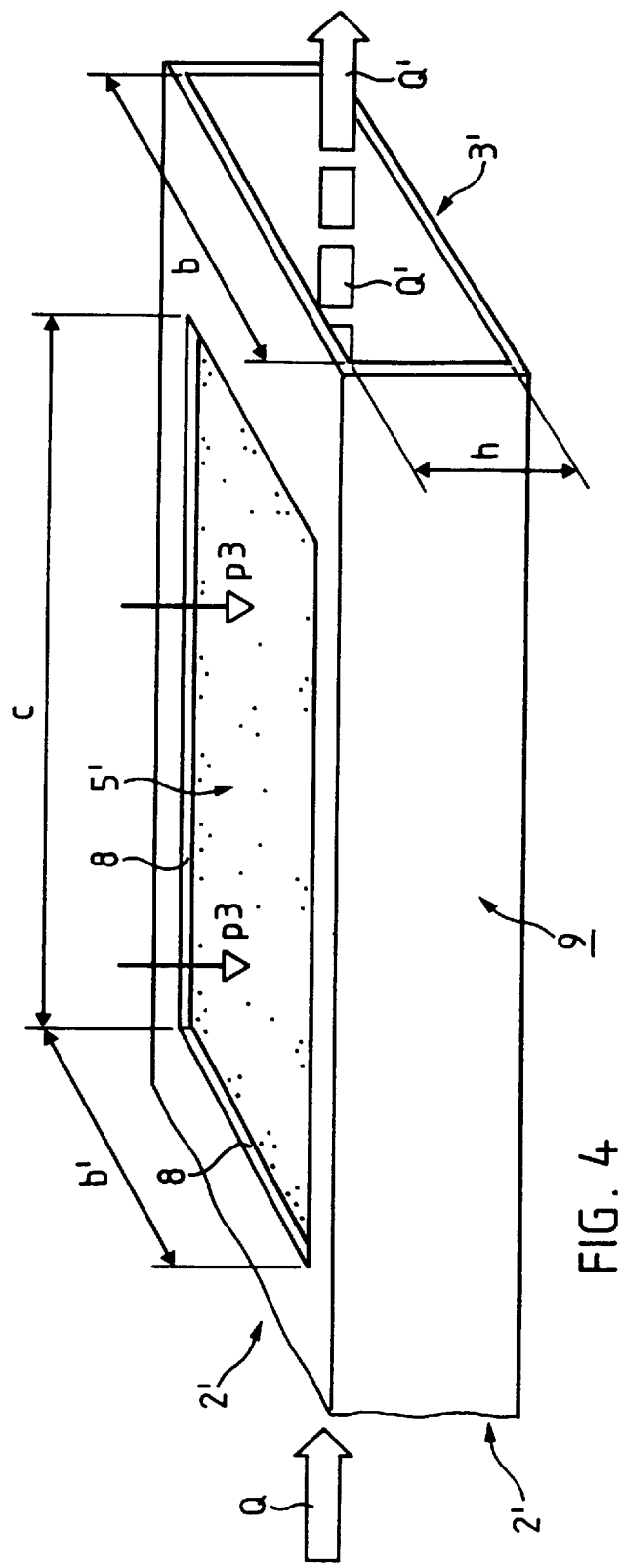

METHOD AND DEVICE FOR PRODUCING PERIODICAL IMPULSE CHANGES IN A FLUID FLOW

The present invention relates to a device for providing a periodically pulsating flow in a fluid carried by a pressure line, as well as to a method for providing such a flow. The disclosure of EPC priority application No. 95810815.1 of Dec. 22, 1995 is incorporated herein by reference.

BACKGROUND OF THE INVENTION

In hydraulic engineering, periodically pulsating flows are often required to perform a mixing process, to obtain specific flow effects, or to detach media from surfaces to which they are attached.

Mechanically actuated control elements, such as flaps etc., are well known for such purposes. Yet they are expensive, prone to breakdowns, and are also often energy inefficient.

The present inventor has discovered that a hydrodynamical phenomenon, discovered in 1909 by the Hungarian mechanical engineer and professor at the TH Budapest, Dónát Bánki, and which has previously remained unused (Bánki, Zeitschr. des Verein deutsch. Ingenieure, 1909, S. 1496, Kommissionsverlag; Julius Springer, Berlin), can be utilized to overcome the deficiencies of the prior art.

Bánki described a tube fed from a liquid vessel. At one point in the tube a rubber tube with a very thin wall is interposed, which rubber tube is surrounded by a glass tube of larger diameter in which it was possible to produce a pressure differing from atmospheric pressure. An overpressure could be set with the aid of a water-filled funnel connected to the intermediate space between the glass tube and rubber tube via a supply tube. The funnel could be held at any height to adjust the pressure. A vacuum could be produced in the intermediate space with the aid of a Bunsen-type water-jet injector. Through the thin wall of the rubber tube the water flow in the rubber tube is affected by the pressure prevailing in the surrounding intermediate space. When that pressure is increased, the remarkable, as it were paradoxical, phenomenon appears that the rubber tube expands. During the experiments, Bánki reported that the extremely thin-walled rubber tube usually burst due to strong vibrations. However, expansion was achieved quite frequently. With the intermediate space under vacuum, the tube always contracted.

This paradox—it seemingly contradicts the Bernoulli equation—has never been investigated in depth, nor were any technical uses ever found or even attempted.

It is thus one of the objects of the present invention to provide a device and a method which, without the use of control valves or the like, effect a periodical impulse change in a fluid to flow.

Another object of the present invention is to provide such a device and method which are economical to produce and efficient and trouble-free in operation.

Yet a further object of the present invention is to provide such a device and method which can be easily integrated into a pressure line system.

BRIEF DESCRIPTION OF THE INVENTION

In accordance with the foregoing and other objects, a device of the present invention is characterized in that, in a pressure line, there is interposed between an upstream section and a downstream section an intermediate member made of an elastic, pressure-resistant medium and that, at its exterior, the intermediate member is at least in part exposed to an external pressure. Relative to the surrounding or ambient pressure, the term "pressure" can be either an overpressure or an underpressure (vacuum) that acts on the elastic intermediate member.

The device of the present invention produces periodic oscillations which, in the downstream section of the pressure line, induces periodic low-frequency pressure oscillations which result in a strongly pulsating flow that can be of an intensity that can lead to cavitation (formation of vapor bubbles), and which can induce eddy currents or rings in the fluid flow.

The elastic intermediate member impresses upon the fluid in the pressure line a pressure which affects the energy equilibrium within the stationary flow, as defined by the known Bernoulli equation. Due to the resulting change in cross-section of the elastic intermediate member, the continuity of the mass and energy flow in the fluid is temporarily interfered with, i.e., they are destabilized, whereby the fluid-mechanical parameters of the system exhibit properties of a resonant circuit.

The present invention can be incorporated in particularly simple configurations utilizing rotationally symmetrical designs. Formation of the intermediate member as a membrane-like structure can facilitate an easily realizable adaptation to existing configurations and line systems. By using two oppositely located windows, the pulsation stroke (amplitude) can be easily enlarged. By varying the pressure applied to the intermediate member, it is possible to control the pulsation frequency of the flow.

A particularly simple and economical embodiment of the invention is a device in which the fluid flow itself is utilized to provide the pressure applied to the intermediate member. Such an embodiment does not require auxiliary units, such as additional pressure sources, compressors, etc.

The present invention is particularly advantageous in connection with biological processes, for instance in processes which take place in a clarification plant. In addition, the high impulse yield which can be obtained enables enchancement of dissolving and mixing processes, even in cases that up to now required the use of ultrasound and/or special agitators. Further, the present invention is energy efficient, and can facilitate realization of fluid transport systems that, because of the required air supply, were previously feasible only with difficulty or were totally unfeasible.

BRIEF DESCRIPTION OF THE DRAWINGS

FIG. 1b is a cross-section along line A—A of FIG. 1a;

FIG. 4 shows a box-like intermediate member with a flat membrane.

DETAILED DESCRIPTION OF THE INVENTION

Figure 1B:
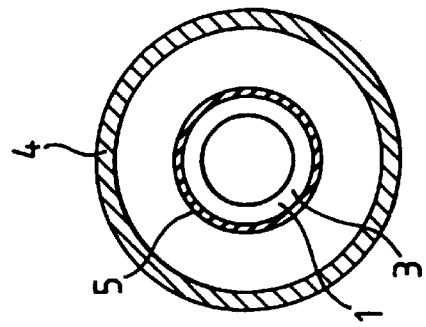
Figure 1A:
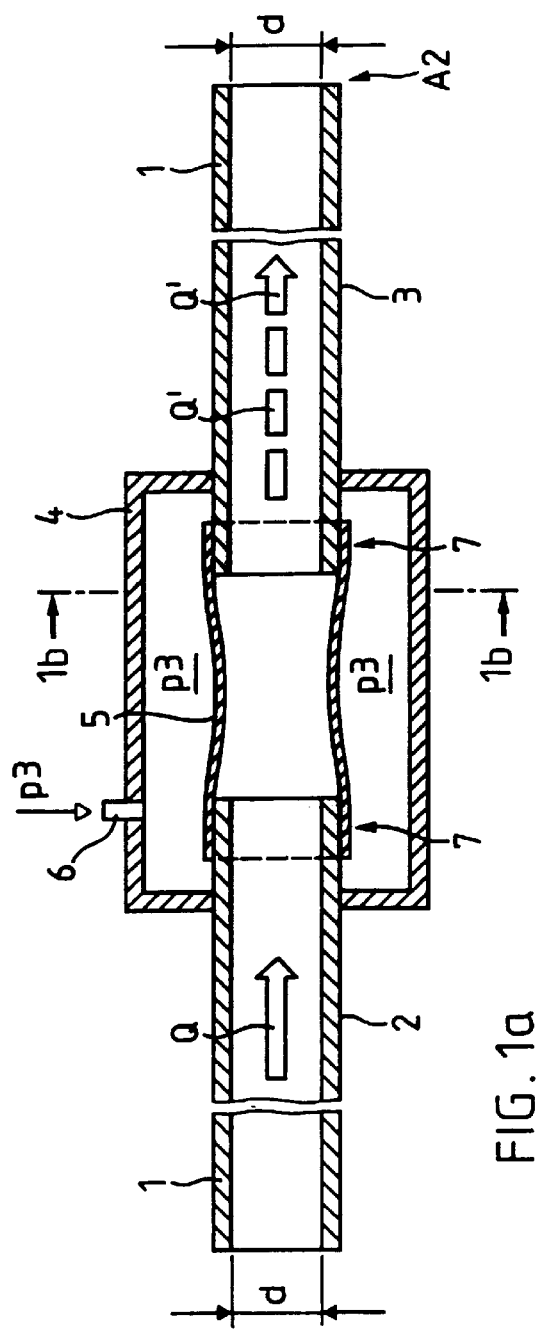
FIG. 1a is a schematic cross-sectional view of a rotationally symmetric device in accordance with the present invention for producing periodic pressure oscillations.

Referring initially to FIGS. 1a and 1b, reference numeral 1 designates a common pressure line in a pressure-medium system, for instance a compressed-air system, with the pressure line 1 having a constant internal diameter d. Component A2 of the downstream section 3 serves as an outflow nozzle. In the upstream section 2 of the pressure line 1 a continuous flow Q can be observed.

Interposed in the direction of flow (marked by arrows) there is located a pressure chamber 4, which forms a hollow body tightly mounted on the section 2, and which contains an intermediate member 5. The pressure chamber, like the pressure line, may be of circular cross-section. The intermediate member is gas-tightly attached as known in the art to a peripheral attachment point 7 to the upstream section 2 of the pressure line 1 and is similarly connected to a contiguous downstream section 3 of the pressure line 1 having the same diameter d.

The pressure chamber 4 is also provided with a control connector 6 which permits the intermediate member 5 to be subjected to a pressure p3. If the pressure p3 is an overpressure, a pulsating flow is created, characterized by an intermittent flow Q' in section 3 of the pressure line 1. A similar pulsating flow Q' is created by an underpressure p3.

Figure 2:
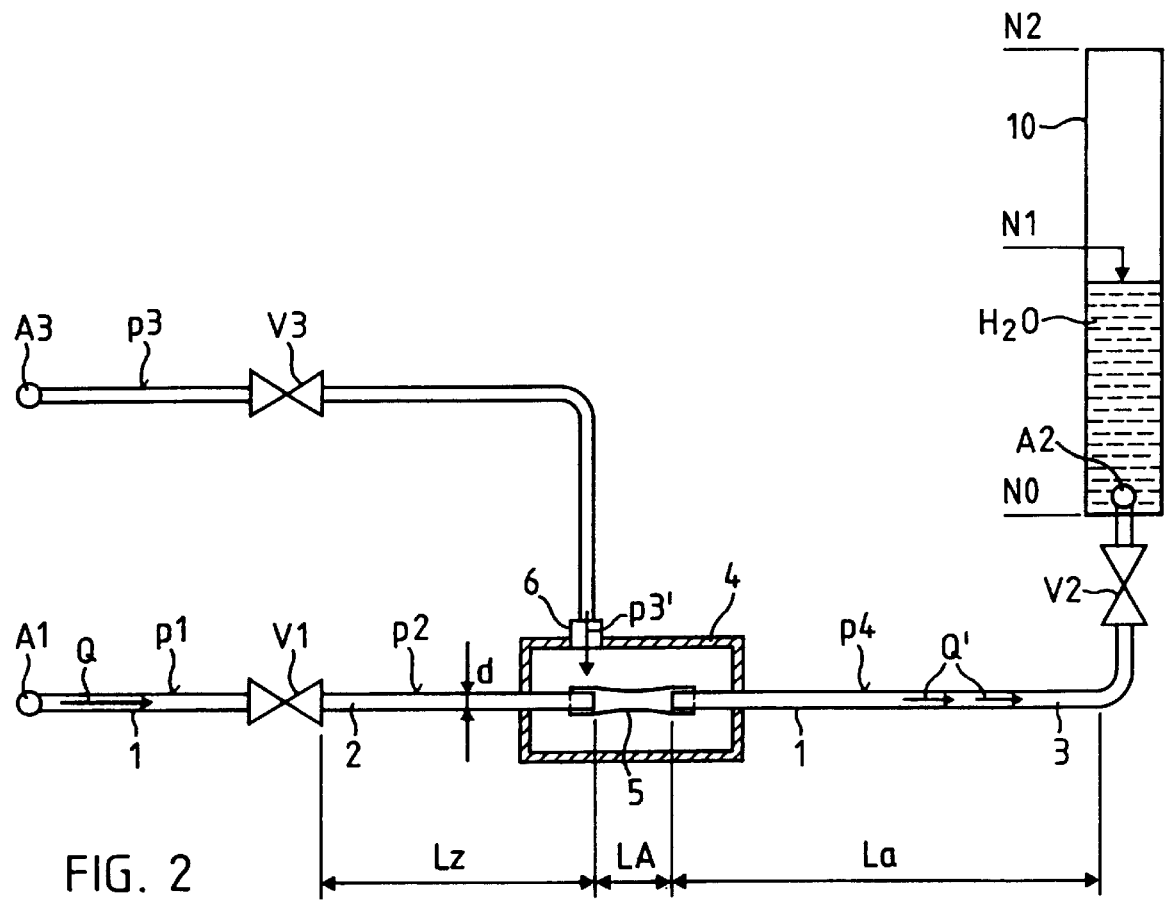
FIG. 2 shows a device of the present invention for the aeration of water or the enhancing of mixing processes.

According to FIG. 2, an aeration device in accordance with the present invention comprises a vessel 10, with the vessel bottom located at the zero level NO. The vessel is filled with water or another liquid to be aerated, with an actual filling height N1 and a maximum filling height N2. Located at the vessel bottom is an outflow nozzle A2 for the pressure line 1 through which flows pulsating compressed air. Upstream of the nozzle A2 is a cutoff-reduction valve V2.

Pressure line 1 is provided with a connector A1 which is connected to a pressure source (not shown). Pressure line 1 is characterized by an internal diameter d, a fluid flow Q and line pressure p1. A first cutoff-reduction valve V1 is arranged at a distance Lz from the right-hand end of the upstream section 2, the length of the pressure line in the downstream section 3 up to the second cutoff-reduction valve V2 being La. The distance between the two sections, i.e., the active length of the intermediate member 5, is LA.

Here again the intermediate member 5 is surrounded by a hollow body 4, into which leads a control connector 6 to which is connected a line in which, downstream of a control-pressure regulating valve V3, prevails a control pressure p3'. As a control source external connector A3 allows connection to a pressure source.

In the upstream section 2 there prevails a pressure p2, and in the downstream section 3, a pressure p4. Pressure p4 is of an impulse-like form and produces the corresponding flow Q'.

Figure 3:
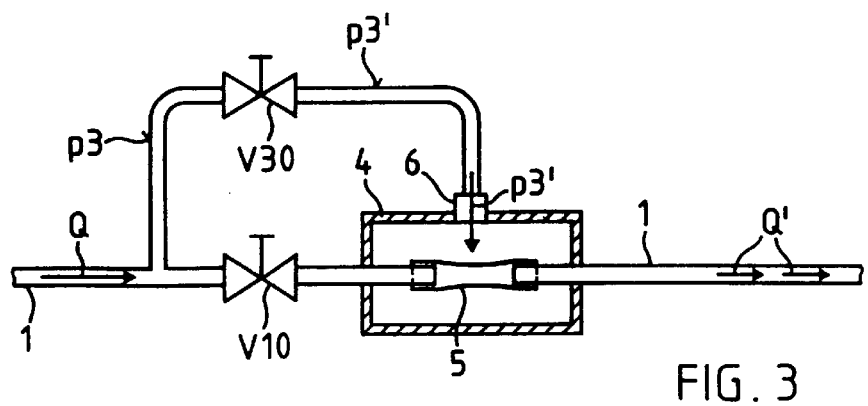
FIG. 3 is a representation of a device and method utilizing the pressure of the fluid flow for the production of the pulsating flow.

The arrangement in FIG. 3, simplified relative to FIG. 2, also has a pressure line 1 carrying a flow Q, from which branches off a bypass with a control pressure p3 that, via a reduction valve V30, is reduced to a magnitude p3'. Within the pressure line 1 there is seen another reduction valve V10, the remainder of the arrangement being analogous to that of FIG. 2. The device according to FIG. 3 is simpler in its design and therefore particularly economical in its manufacture and maintenance. The arrangement of FIG. 3 allows the control pressure to be generated by the flow in pressure line 1, thus eliminating the need for an auxiliary pressure source.

In practical experiments it has been seen that the oscillation frequency of the oscillating flow Q' depends primarily on the control pressure p3', but that the resulting fundamental frequency is inversely proportional to the line length La in the downstream section 3. The addition of an outflow throttle, i.e., the outflow nozzle A2, apparently produces reflections, doubling the fundamental frequency. The following relationships were determined and serve for an estimation of the theoretical oscillation frequency $f_{th}$ with a system with air as a fluid:

| Without outflow throttle | With outflow throttle |
| --- | --- |
| $f_{th} = c/(4 \cdot L_a)$ | $f_{th} = c/(2 \cdot L_a)$ | c = velocity of sound in the system

The internal diameter d of the pressure line was 26 mm; the active length LA of the intermediate member 100 mm; the line length Lz in the upstream section 1000 mm; the line length La in the downstream section 550 mm, and the diameter of the outflow nozzle serving as throttle A2 was 13 mm.

Typical fundamental frequencies achieved were between 30 Hz and 400 Hz, with the system pressure p1 being varied between 2.0 and 8.0 bar and the control pressure p3' between 10 and 300 mbar.

While in the above-described experiments periodical pulsations were induced in air at room temperature, the following data relate to water at 18° C.

The resulting pulsation frequency, produced with an analogous device, was only 5 to 25 Hz, with the control pressure p3' being varied between 10 and 500 mbar. System pressure was 2 to 8 bar.

In an analogous manner it is possible to control the periodic oscillations of fluid flows in channel-like ducts. As seen in FIG. 4, a conventional channel is used as carrier for an intermediate member 5' and has a box-like upstream section 2' and a similar downstream section 3'. Flow height is designated h and flow width, b. In the upper wall of the carrier or channel member 9 there is cut out a rectangular window 8 having a length c and a width b'. The window 8 is pressure-tightly closed by a rubber member 5' which, in a suitable manner, is impacted upon by a control pressure p3. The channel-like carrier 9 has the advantage that, because of its plane surfaces, a connection for the control pressure is easily effected via flanges and/or, directly, via pipelines.

In all experiments, the elastic intermediate members were made of commercially available butyl rubber (supplier: Maloya Vredestein AG, CH-4460 Gelterkinden). Service life of this membrane material could be additionally increased by suitable reinforcements adapted to the deformation path.

One skilled in the art can readily recognize that modifications and adaptations to the embodiments of the invention set forth can be accomplished without departing from the scope and intent of the invention. The object of the invention could also be adapted to fit curved pipeline systems. At the same time it will be understood from the above-described that elastic expansion and compensation elements such as used in pipelines for compensation of thermal expansion are liable to produce oscillations in the fluid and are thus frequently the cause of previously unexplained pipeline fractures.

I claim:

1. A device for producing a periodically pulsating flow in a pressure line, comprising an intermediate member located between an upstream section and a downstream section of said pressure line, said intermediate member forming a flow chamber between said upstream and downstream sections, said flow chamber comprising elastic, pressure-resistant material means for asserting a continuing periodic contraction and expansion of the flow chamber, a hollow body surrounding said intermediate member, and pressure generation means coupled to said hollow body to control pressure within the hollow body, said pressure generation means comprising a continuous control pressure flow path coupled to said upstream section and a throttle in said flow path.

2. A device of claim 1 wherein said pressure-resistant material means is in the form of a membrane.

* * * * *